(12) United States Patent
Long

(10) Patent No.: US 8,534,155 B2
(45) Date of Patent: Sep. 17, 2013

(54) ROBOT ARM ASSEMBLY

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 296 days.

(21) Appl. No.: 12/952,412

(22) Filed: Nov. 23, 2010

(65) Prior Publication Data
US 2011/0290060 A1 Dec. 1, 2011

(30) Foreign Application Priority Data
May 28, 2010 (CN) .......................... 2010 1 0186017

(51) Int. Cl.
*B25J 17/00* (2006.01)
*B25J 17/02* (2006.01)
*B25J 18/00* (2006.01)

(52) U.S. Cl.
USPC .......... 74/490.06; 74/490.01; 901/25; 901/28

(58) Field of Classification Search
USPC .............. 74/490.01, 490.03, 490.06; 901/28, 901/29, 25; 414/735
See application file for complete search history.

(56) References Cited

U.S. PATENT DOCUMENTS

| | | | | |
|---|---|---|---|---|
| 3,262,593 A | * | 7/1966 | Hainer | 414/619 |
| 3,543,592 A | * | 12/1970 | Jelatis et al. | 74/89.16 |
| 3,572,519 A | * | 3/1971 | Tezuka | 414/744.7 |
| 3,572,807 A | * | 3/1971 | Haaker et al. | 294/106 |
| 3,739,923 A | * | 6/1973 | Totsuka | 414/735 |
| 3,845,284 A | * | 10/1974 | Taguchi et al. | 318/567 |
| RE28,437 E | * | 6/1975 | Devol | 198/341.01 |
| 3,906,323 A | * | 9/1975 | Ono et al. | 318/563 |
| 4,047,448 A | * | 9/1977 | Pardo et al. | 74/417 |
| 4,489,624 A | * | 12/1984 | Schaib et al. | 74/490.03 |
| 4,499,790 A | * | 2/1985 | Helms | 74/665 C |
| 4,507,046 A | * | 3/1985 | Sugimoto et al. | 414/735 |
| 4,512,710 A | * | 4/1985 | Flatau | 414/735 |
| 4,548,097 A | * | 10/1985 | Zimmer | 74/665 M |
| 4,574,655 A | * | 3/1986 | Kimura | 74/665 A |
| 4,586,868 A | * | 5/1986 | Nakashima et al. | 414/735 |
| 4,642,021 A | * | 2/1987 | Kikuchi | 414/735 |
| 4,671,732 A | * | 6/1987 | Gorman | 414/735 |

(Continued)

FOREIGN PATENT DOCUMENTS

| | | | |
|---|---|---|---|
| DE | 3736355 A1 | * | 5/1988 |
| EP | 121576 A1 | * | 10/1984 |
| EP | 240438 A1 | * | 10/1987 |
| EP | 249232 A1 | * | 12/1987 |

*Primary Examiner* — David M Fenstermacher
*Assistant Examiner* — Jake Cook
(74) *Attorney, Agent, or Firm* — Altis Law Group, Inc.

(57) ABSTRACT

A robot arm assembly includes a support arm, and the support arm includes a mounting base and a connecting portion defining a hollow portion. The robot arm assembly further includes a first arm, a second arm, a first input shaft, a second input shaft coaxial with and rotatable relative to the first input shaft, a first gear transmission mechanism coupled to the first input shaft to rotate the first arm, a second gear transmission mechanism coupled to the second input shaft to rotate the second arm, and a first backlash adjust mechanism to adjust the positions of the connecting portion, of the first and second input shafts relative to the mounting base, and providing the adjustment of the backlash between the first input gear pair and the second input gear pair.

11 Claims, 5 Drawing Sheets

(56) References Cited

U.S. PATENT DOCUMENTS

| | | | | |
|---|---|---|---|---|
| 4,685,861 A | * | 8/1987 | Huetsch | 414/729 |
| 4,846,015 A | * | 7/1989 | Keppler et al. | 74/665 GC |
| 4,900,997 A | * | 2/1990 | Durand et al. | 318/568.2 |
| 5,145,312 A | * | 9/1992 | Sonoda et al. | 414/719 |
| 5,924,330 A | * | 7/1999 | Danielsson et al. | 74/490.06 |
| 8,020,466 B2 | * | 9/2011 | Inoue et al. | 74/490.02 |
| 8,029,229 B2 | * | 10/2011 | Aiken | 414/729 |
| 2009/0139364 A1 | * | 6/2009 | Forslund et al. | 74/490.06 |
| 2011/0067514 A1 | * | 3/2011 | Long | 74/420 |
| 2011/0107867 A1 | * | 5/2011 | Long | 74/490.05 |
| 2011/0113916 A1 | * | 5/2011 | Long | 74/490.01 |
| 2011/0120245 A1 | * | 5/2011 | Long | 74/409 |
| 2011/0126661 A1 | * | 6/2011 | Long | 74/490.05 |
| 2011/0232410 A1 | * | 9/2011 | Long | 74/490.01 |
| 2011/0265597 A1 | * | 11/2011 | Long | 74/490.05 |
| 2011/0290060 A1 | * | 12/2011 | Long | 74/490.01 |

* cited by examiner

ROBOT ARM ASSEMBLY

CROSS-REFERENCE TO RELATED APPLICATION

This application is related to a co-pending U.S. patent application, Ser. No. 12/632,955, filed on Dec. 8, 2009, and entitled "ROBOT ARM ASSEMBLY AND INDUSTRIAL ROBOT USING THE SAME". The inventor of the above co-pending application is Bo Long. The co-pending application has the same assignee as the present application. The disclosure of the above-identified application is incorporated herein by reference.

BACKGROUND

1. Technical Field

The present disclosure generally relates to robotic technologies, and particularly, to an robot arm assembly.

2. Description of Related Art

A commonly used industrial robot includes a fixed base, a frame pivotally connected thereto about a first rotation axis, a lower arm, one end of which is pivotally connected to the frame about a second rotation axis, and an upper arm, one end of which is pivotally connected to the other end of the lower arm about a third rotation axis. An end effector, such as a welding device, a gripper or a cutting tool, is mounted at a distal end of the upper arm. Generally six axes are utilized to achieve maximum amount of movements of the end effector.

In robots of this kind, each arm rotates around a rotation axis driven by a driving unit. Typically, the driving unit includes a motor mounted on the lower arm and a speed reducer coupled to the motor to transmit the movement of the motor to the upper arm. The speed reducer may be a high gear ratio gear, such as a harmonic gear reducer, a rotary vector reducer, or a planetary reducer. The motor and the speed reducer are arranged along the rotation axis of the arm, rendering the range along the rotation axis relatively large. In a six-axis industrial robot, the fifth arm is rotatably connected to the sixth arm and may be perpendicular thereto. The fifth and sixth arms are respectively driven by two driving units arranged adjacent to each other, such that the combined fifth and sixth arms are relatively large. As a result, the industrial robot needs considerable amount of space to operate freely and safely.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
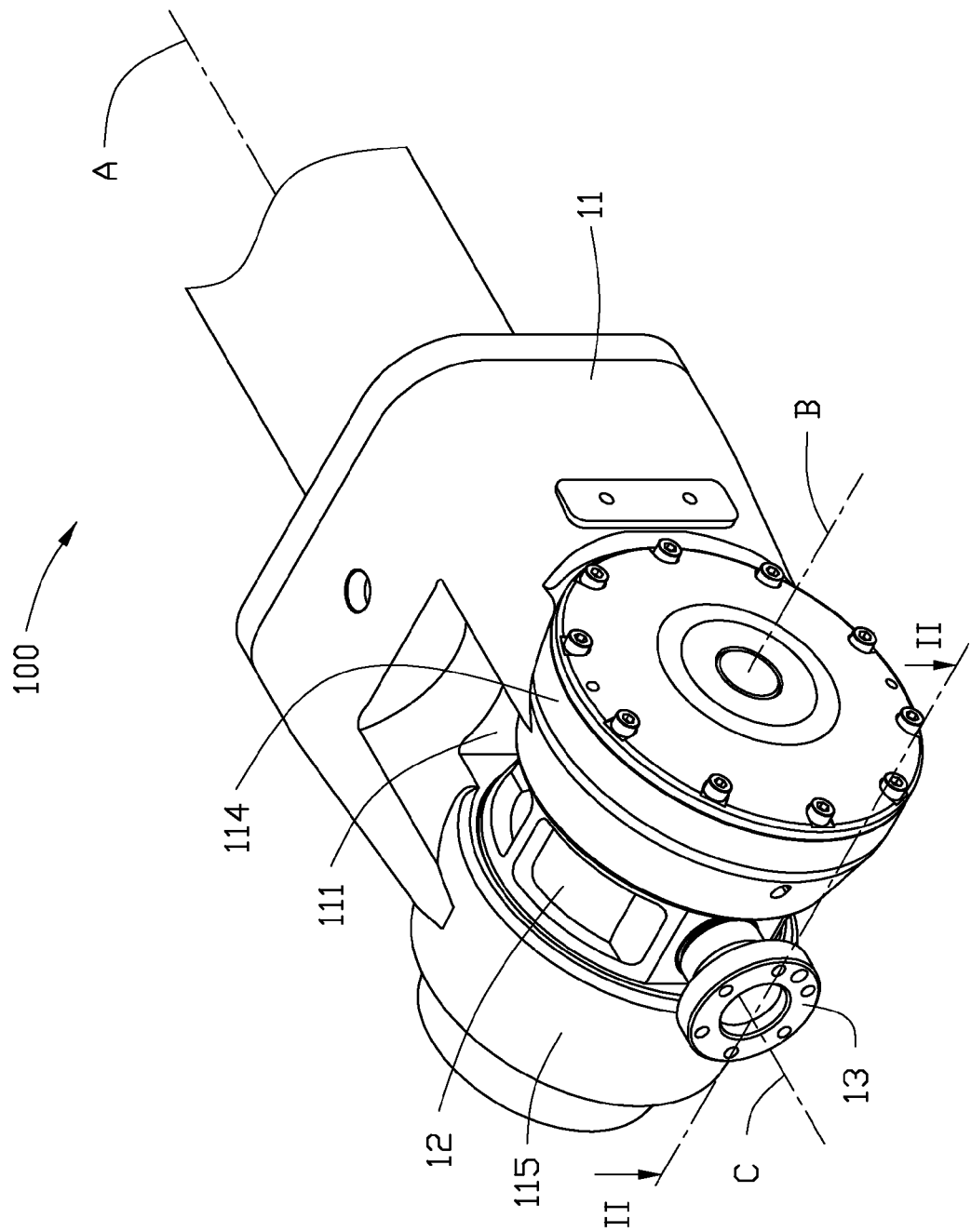
FIG. 1 is an isometric view of one embodiment of a robot arm assembly including a support arm, a first arm rotatably connected to the support arm, and a second arm rotatably connected to the first arm.
Figure 2:
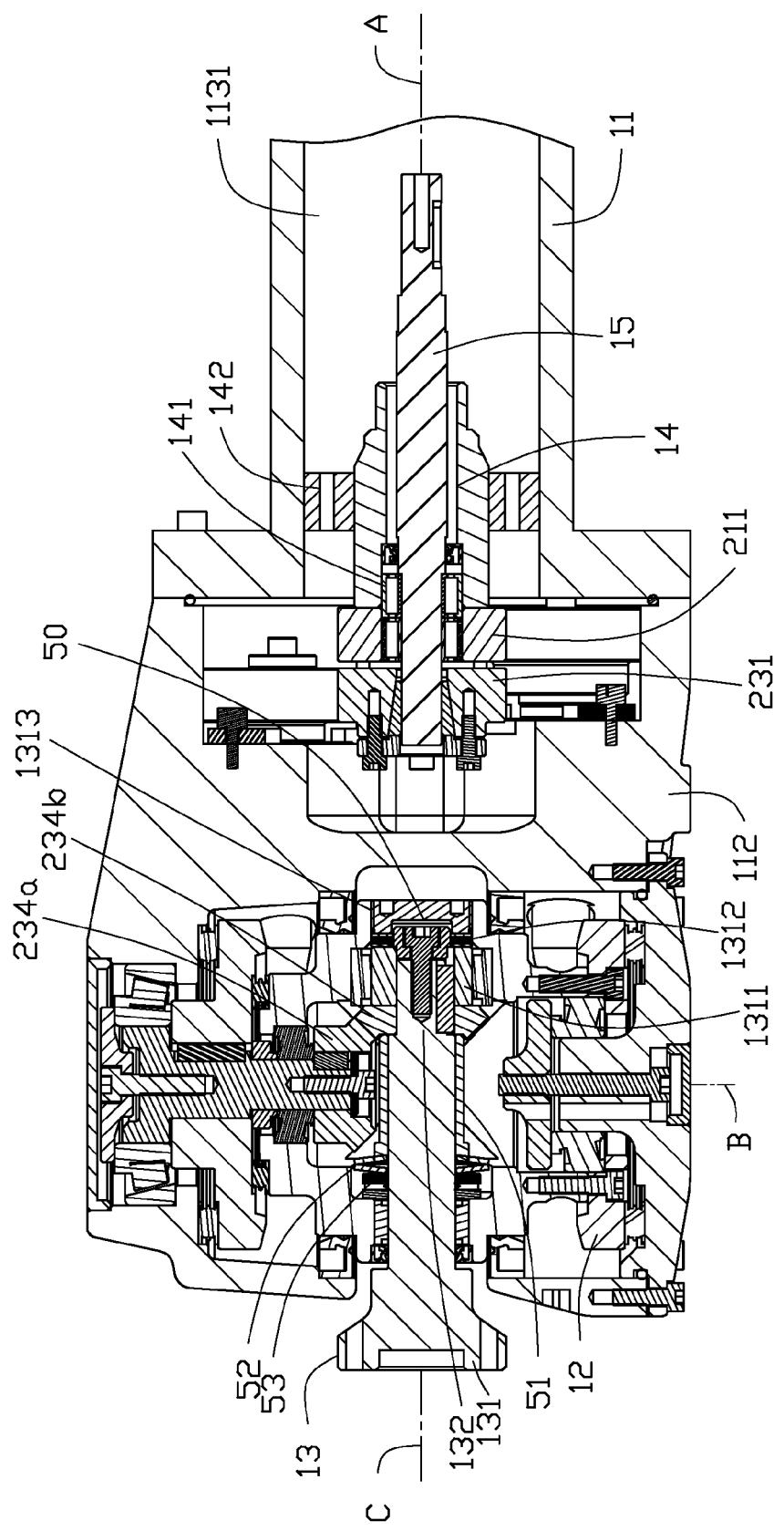
FIG. 2 is a cross section of the robot arm assembly of FIG. 1, taken along the line II-II.
Figure 3:
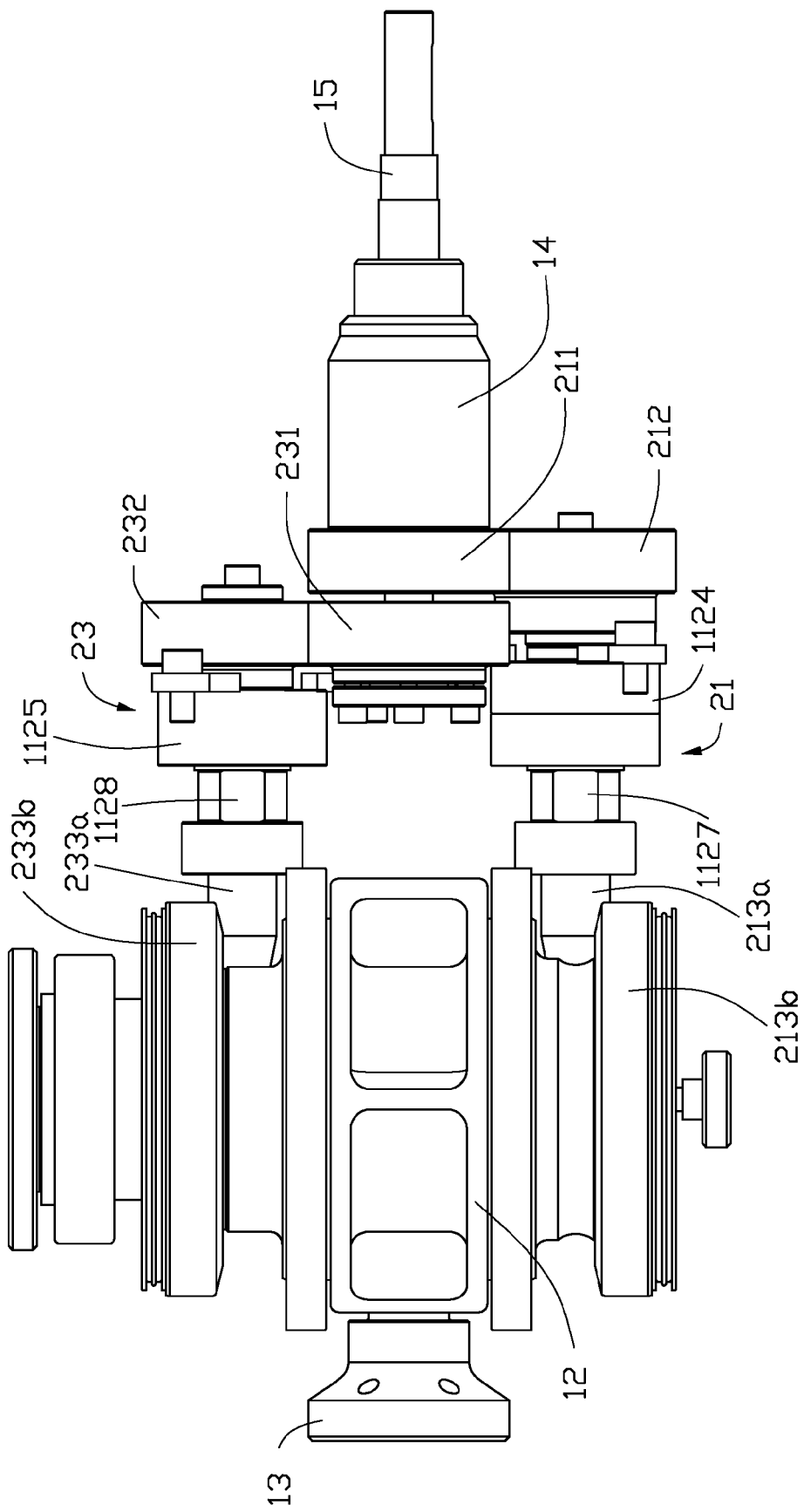
FIG. 3 is a plan view of a first gear transmission mechanism and a second gear transmission mechanism coupled to the first and second arms, respectively, wherein the support arm and the first arm have been omitted.

Referring to FIGS. 1 through 3, one embodiment of a robot arm assembly 100 may be used with a six-axis industrial robot and includes a support arm 11, a first arm 12 rotatably connected to the support arm 11, a second arm 13 rotatably connected to the first arm 12, a first input shaft 14, a second input shaft 15 coaxial with and rotatable relative to the first input shaft 14, a first gear transmission mechanism 21 coupled to the first input shaft 14 to rotate the first arm 12, and a second gear transmission mechanism 23 coupled to the second input shaft 15 to rotate the second arm 13. In the illustrated embodiment, the arms 11, 12, 13 are rotatable about rotation axes A, B, C, respectively. An end effector, such as a welding device, a gripper or a cutting tool may be mounted on the distal end of the second arm 13 to perform a predetermined action.

The first input shaft 14 is a hollow structure, and is sleeved on the second input shaft 15, and the second input shaft 15 is supported by one or more roll bearings 141 around the second input shaft 15. The first and second input shafts 14, 15 are coupled to a plurality of actuators (not shown) mounted on the support arm 11, respectively, thus transferring the movement of the actuators to the first and second arms 12, 13.

The first gear transmission mechanism 21 includes a first input gear pair (not labeled) including two meshed gears 211, 212, and a first output bevel gear pair (not labeled) including two meshed gears 213a, 213b. The meshed gears 211, 212 are a plurality of cylindrical gears, and the gears 213a, 213b are a plurality of hypoid bevel gears. The gear 211 is fixed to the first input shaft 14, and the gear 213b is fixed to the first arm 12. The gear 212 is aligned with the gear 213a, thus coupling the first output bevel gear pair to the first input gear pair.

The second gear transmission mechanism 23 includes a second input gear pair (not labeled) including two meshed gears 231, 232, an intermediate bevel gear pair (not labeled) including two meshed gears 233a, 233b, and a second output bevel gear pair (not labeled) including two meshed gears 234a, 234b. The gear 232 is aligned with the gear 233a, and the gear 233b is aligned with the gear 234a. The gear 231 is fixed to the second input shaft 15, and the gear 234b is fixed to the second arm 13. The gears 231, 232 are the cylindrical gears, and the gears 233a, 233b are the hypoid bevel gears.

The gear 211 is parallel to and offset from the gear 231 along the axis of the first input shaft 14. The gears 212, 232 are positioned on two sides of the first input shaft 14. The axis of the first and second input shafts 14, 15 is parallel to and apart from that of the gears 212, 232.

Figure 4:
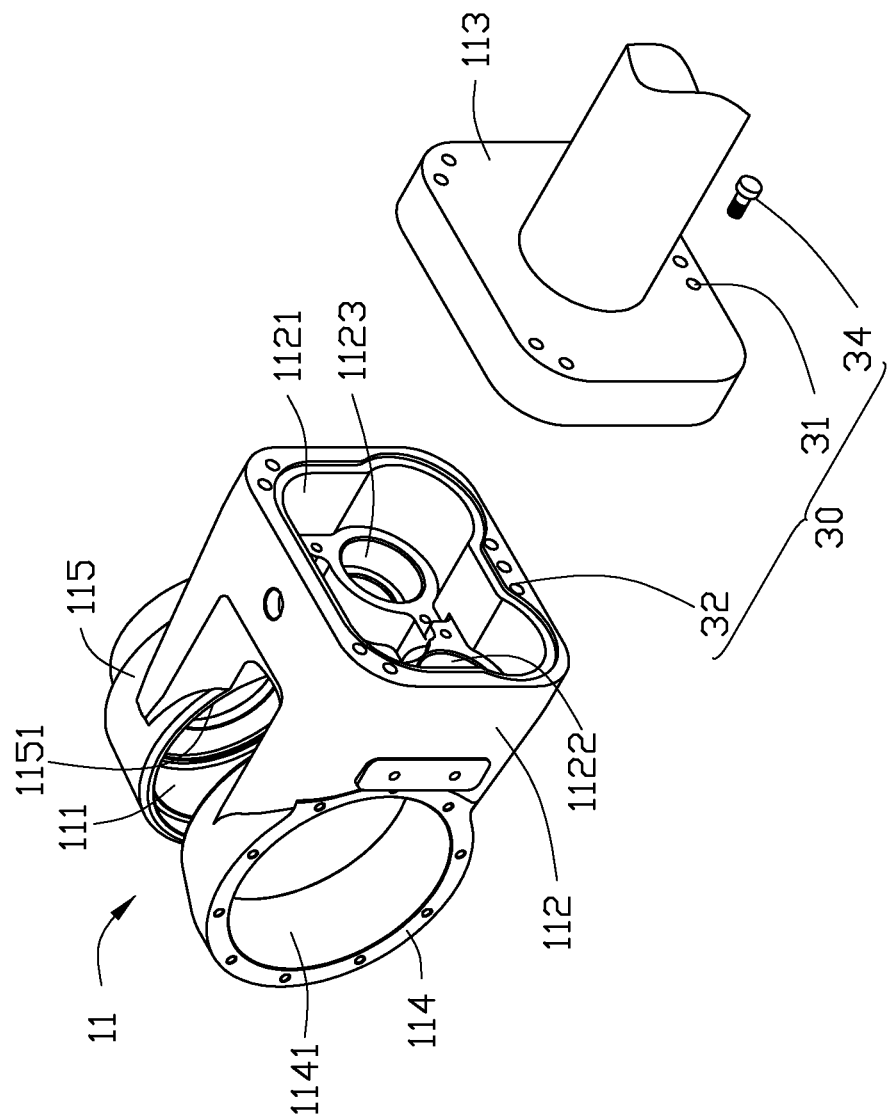
FIG. 4 is an exploded, isometric view of the support arm in FIG. 1.

Referring to FIGS. 2 and 4, the support arm 11 includes a mounting base 112, a connecting portion 113 connected to the mounting base 112, a first support portion 114 and a second support portion 115 extending from opposite sides of the mounting base 112. The connecting portion 113 and the first and second support portions 114, 115 are located on opposite ends of the mounting base 112. The first and second support portions 114, 115, and the mounting base 112 cooperatively define a U-shaped receiving portion 111 to receive the second arm 13. The first and second support portions 114, 115 are substantially parallel, and define a first receiving hole 1141 and second receiving hole 1151, respectively.

The connecting portion 113 defines a hollow portion 1131 extending along the rotation axis A. The first and second input shafts 14, 15 are rotatably received in the hollow portion 1131. The first input shaft 14 is received rotatably through one or more roll bearings 142 mounted in the hollow portion 1131.

The mounting base 112 defines a receiving chamber 1121 towards the connecting portion 113. The bottom surface of the receiving chamber 1121 defines a first shaft hole 1122 and a second shaft hole 1123 to receive a first gear shaft 1127 and a second gear shaft 1128, respectively. The first and second gear shafts 1127, 1128 are supported by a first shaft base 1124 and a second shaft base 1125 fixed in the mounting base 112, respectively. The first gear shaft 1127 connects the gears 212, 213a, and the second gear shaft 1128 connects the gears 232, 233a.

The robot arm assembly 100 further includes a first backlash adjust mechanism 30 to adjust the backlash between the first input gear pair and the second input gear pair, and a second backlash adjust mechanism (not labeled) to adjust the backlash between the second output bevel gear pair.

The first backlash adjust mechanism 30 has a plurality of through holes 31 defined in the connecting portion 113, a plurality of threaded holes 32 defined in the mounting base 112, and a plurality of fasteners 34 received in the corresponding through holes 31 and engaged into the corresponding threaded holes 32, respectively. In FIG. 2, only one fastener 34, as an example, is shown. The through hole 31 has a larger diameter than that of the fastener 34 to allow radial movement of the corresponding fastener 34. Because the axis of the first and second input shafts 14, 15 is substantially parallel to those of the gears 212, 232, therefore, when the position of the connecting portion 113 relative to the mounting base 112 is adjusted, that is, the positions of the first and second input shafts 14, 15 are being adjusted, the distance between the first and second input shafts 14, 15 and the gears 212, 232 are also adjusted, thus adjusting the backlash between the first input gear pair and the second input gear pair.

Figure 5:
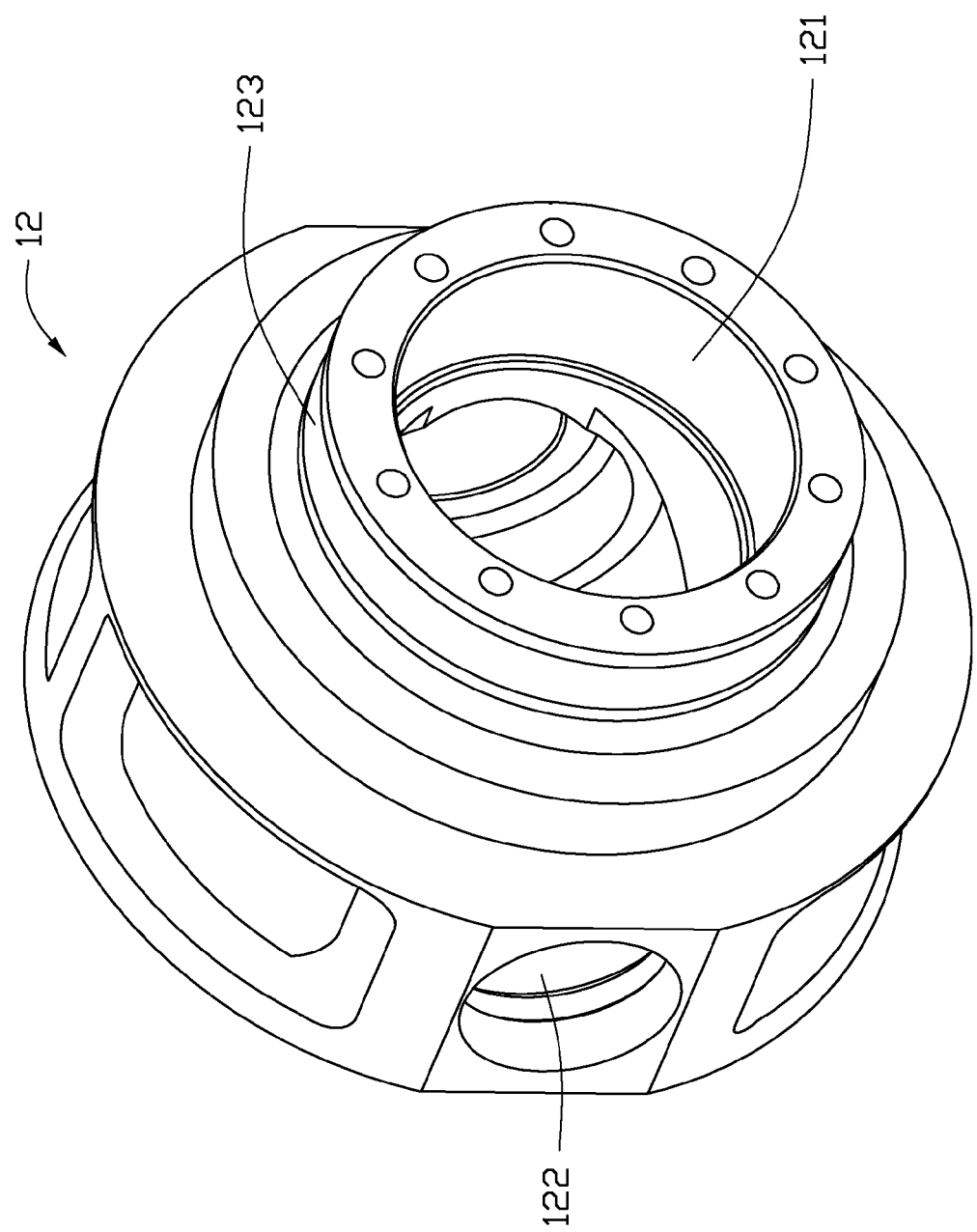
FIG. 5 is an isometric view of the first arm in FIG. 1.

Referring also to FIG. 5, the first arm 12 is substantially a hollow cylinder and defines a first assembly hole 121 along a central axis thereof, and a second assembly hole 122 extending radially. The second assembly hole 122 is positioned in the middle portion of the first arm 12. The beveled gear 213b is fixed to a first end 123 of the first arm 12 to rotate the first arm 12 about the rotation axis B. The first arm 12 is rotatably received in the receiving hole 1141 and supported by one or more bearings (not labeled).

The second arm 13 includes a free end 131 and a mounting end 132 opposite to the free end 131. The mounting end 132 is received in the second assembly hole 122 and fixed to the gear 234b. The second arm 13 is supported by one or more bearings 1311 received in the first arm 11.

The second backlash adjust mechanism includes a first thrust bearing 1312 mounted in the second assembly hole 122 and contacting the mounting end 132 of the second arm 13, an inner threaded segment 1313 formed in the second assembly hole 122, an adjust member 50 engageably received in the threaded segment 1313 and contacting the first thrust bearing 1312, a sleeve 51, an elastic member 52, and a second thrust bearing 53 positioned between the inner surface of the first arm 11 and the gear 234b. The second thrust bearing 53 is connected to the first arm 11, and the elastic member 52 resiliently biasing the sleeve 51 and the gear 234b toward the first thrust bearing 1312, thus moving the gear 234b away from the gear 234a and adjusting the backlash between the second output bevel gear pair. The axial position of the gear 234b is maintained by the elastic member 52 and the adjust member 50. The positions of the first thrust bearing 1312 and the gear 234b along the rotation axis C can be adjusted by rotation of the adjust member 50 in and out of the second assembly hole 122, thus adjusting the backlash between the second output bevel gear pair. In the illustrated embodiment, the elastic member 52 may be stacked disc-shaped sheets.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A robot arm assembly comprising:
    a support arm comprising a mounting base and a connecting portion connected to the mounting base, and the connecting portion defining a hollow portion;
    a first arm rotatably connected to the support arm;
    a second arm rotatably connected to the first arm;
    a first input shaft;
    a second input shaft coaxial with and rotatable relative to the first input shaft, and the first and second input shafts being rotatably received in the hollow portion;
    a first gear transmission mechanism coupled to the first input shaft to rotate the first arm, the first gear transmission mechanism comprising a first input gear pair having one gear fixed to the first input shaft, and a first output bevel gear pair having one bevel gear fixed to the first arm;
    a second gear transmission mechanism coupled to the second input shaft to rotate the second arm, the second gear transmission mechanism comprising a second input gear pair having one gear fixed to the second input shaft, an intermediate bevel gear pair, and a second output bevel gear pair having one bevel gear fixed to the second arm;
    a first backlash adjust mechanism to move the connecting portion, and the positions of the first and second input shafts relative to the mounting base, thus adjusting the backlash between the first input gear pair and the second input gear pair; and
    a second backlash adjust mechanism to adjust the backlash between the second output bevel gear pair, wherein the first arm defines a first assembly hole along a central axis thereof, and a second assembly hole extending radially and intersecting with the first assembly hole, the second arm is rotatable received in the second assembly hole, and the first and second output bevel gear pairs are received in the first assembly hole, the second backlash adjust mechanism comprising a first thrust bearing mounted in the second assembly hole and contacting an end of the second arm, an adjust member engaging into the second assembly hole and contacting the first thrust bearing and adjusting the axial position thereof, an elastic member elastically biasing the second arm toward the first thrust bearing, and a second thrust bearing positioned between an inner surface of the first arm and the elastic member.

2. The robot arm assembly of claim 1, wherein the first backlash adjust mechanism comprises a plurality of through holes defined in the connecting portion, a plurality of threaded holes defined in the mounting base, and a plurality of fasteners each of which is received in the corresponding through hole and engaged into the corresponding threaded hole; each through hole has a larger diameter than that of the fastener to allow radial movement of the corresponding fastener.

3. The robot arm assembly of claim 1, wherein the first input shaft is a hollow structure and sleeved on the second input shaft.

4. The robot arm assembly of claim 1, further comprising at least one roll bearing for supporting the second input shaft.

5. The robot arm assembly of claim 1, wherein the first input gear pair are a plurality of cylindrical gears, and the first output bevel gear pair are a plurality of hypoid bevel gears.

6. The robot arm assembly of claim 1, wherein the second input gear pair are a plurality of cylindrical gears, and the second output bevel gear pair are a plurality of hypoid bevel gears.

7. The robot arm assembly of claim 1, wherein the gear of the first input gear pair fixed to the first input shaft is parallel to and offset from the gear of the second input gear pair fixed to the second input shaft.

8. The robot arm assembly of claim 1, further comprising a first gear shaft, a second gear shaft, a first shaft base and a second shaft base mounted in the mounting base, wherein the mounting base defines a receiving chamber toward the connecting portion, the receiving chamber comprising a bottom surface defining a first shaft hole and a second shaft hole to receive the first and second gear shafts, respectively, and the first and second gear shafts are supported by the first and second shaft bases, respectively.

9. The robot arm assembly of claim 1, wherein the second backlash adjust mechanism further comprises a sleeve on the second arm, and the sleeve is positioned between the elastic member and the gear of the second output bevel gear pair fixed to the second arm.

10. The robot arm assembly of claim 9, wherein the elastic member comprises a plurality of stacked disc-shaped sheets.

11. The robot arm assembly of claim 1, wherein the second assembly hole forms an inner threaded segment, and the adjust member engages with the inner threaded segment.

* * * * *